_(12)_ United States Patent
Liu et al.

(10) Patent No.: US 11,288,520 B2
(45) Date of Patent: Mar. 29, 2022

(54) SYSTEMS AND METHODS TO AGGREGATE AND DISTRIBUTE DYNAMIC INFORMATION OF CROWDSOURCING VEHICLES FOR EDGE-ASSISTED LIVE MAP SERVICE

(71) Applicant: Toyota Motor Engineering & Manufacturing North America, Inc., Plano, TX (US)

(72) Inventors: Qiang Liu, Charlotte, NC (US); Baekgyu Kim, Mountain View, CA (US); Rui Guo, Mountain View, CA (US)

(73) Assignee: Toyota Motor Engineering & Manufacturing N.A. Inc., Plano, TX (US)

(*) Notice: Subject to any disclaimer, the term of this patent is extended or adjusted under 35 U.S.C. 154(b) by 0 days.

(21) Appl. No.: 16/912,033

(22) Filed: Jun. 25, 2020

(65) Prior Publication Data

US 2021/0406558 A1    Dec. 30, 2021

(51) Int. Cl.
*G06K 9/00*    (2006.01)
*G06K 9/46*    (2006.01)
*H04L 67/12*   (2022.01)

(52) U.S. Cl.
CPC .......... *G06K 9/00791* (2013.01); *G06K 9/46* (2013.01); *H04L 67/12* (2013.01)

(58) Field of Classification Search
CPC ....... G06K 9/00791; G06K 9/46; H04L 67/12
See application file for complete search history.

(56) References Cited

U.S. PATENT DOCUMENTS

| 6,539,294 | B1 | 3/2003 | Kageyama |
| 9,165,477 | B2 | 10/2015 | Wilson |
| 9,495,602 | B2 | 11/2016 | Okumura |
| 2010/0164701 | A1* | 7/2010 | Bargman .............. G01S 5/0252 340/436 |
| 2011/0059693 | A1 | 3/2011 | O'Sullivan |
| 2016/0306535 | A1* | 10/2016 | Krishnamoorthy ......................... G06F 3/04847 |
| 2017/0075355 | A1 | 3/2017 | Micks et al. |
| 2017/0302364 | A1 | 10/2017 | Cesarano |
| 2019/0135300 | A1* | 5/2019 | Gonzalez Aguirre . G06N 3/088 |
| 2020/0043188 | A1* | 2/2020 | Kato ....................... G06T 7/254 |
| 2020/0193643 | A1* | 6/2020 | Hess ..................... G01S 5/0284 |
| 2020/0371524 | A1* | 11/2020 | Parchami ........... G06K 9/00785 |

FOREIGN PATENT DOCUMENTS

| CN | 110867096 A | 3/2020 |
| CN | 111052202 A | 4/2020 |
| JP | 4605807 B2 | 10/2010 |
| WO | 2018126083 A1 | 7/2018 |

* cited by examiner

*Primary Examiner* — Md K Talukder
(74) *Attorney, Agent, or Firm* — Dinsmore & Shohl LLP (57) ABSTRACT

A method includes receiving sensor data, with one or more sensor of a vehicle, wherein the sensor data is associated with an environment of the vehicle, detecting an object based on the sensor data, determining pixel coordinates of the object based on the sensor data, converting the pixel coordinates of the object to world coordinates of the object, extracting a set of features associated with the object, and transmitting the set of features and the world coordinates to a remote computing device.

13 Claims, 9 Drawing Sheets

| ENTRY NAME | DESCRIPTION |
|---|---|
| OBJECT IDENTIFIER | UNIQUE IDENTIFIER OF THIS OBJECT |
| TIME STAMP | TIME STAMP OF THIS OBJECT |
| LOCATION | THE PHYSICAL LOCATION OF THIS OBJECT IN THE MAP |
| DIRECTION | THE MOVING DIRECTION OF THIS OBJECT |
| FEATURES | THE FEATURES OF THIS OBJECT (FOR MATCHING) |
| CATEGORY | THE CATEGORY OF THIS OBJECT E.G., PERSON, CAR |
| CONFIDENCE | THE MATCHING CONFIDENCE OF THIS OBJECT, E.G., 0.95 |
| DIMENSION | THE PHYSICAL DIMENSION OF THIS OBJECT |
| MOBILITY MODEL | THE MOBILITY MODEL OF THIS OBJECT |

SYSTEMS AND METHODS TO AGGREGATE AND DISTRIBUTE DYNAMIC INFORMATION OF CROWDSOURCING VEHICLES FOR EDGE-ASSISTED LIVE MAP SERVICE

TECHNICAL FIELD

The present specification relates to creating dynamic maps for autonomous vehicles, and more particularly, to systems and methods to aggregate and distribute dynamic information of crowdsourcing vehicles for edge-assisted live map service.

BACKGROUND

Autonomous vehicles require a highly intelligent control system to perceive the surrounding environment, control the mechanical components in the vehicle, plan routing paths, and the like. Perceiving the surrounding environment relies on various sensors on autonomous vehicles, such as cameras and GPS sensors. Autonomous vehicles may also rely on high-definition (HD) maps, which may provide a high-accuracy and high-quality representation of a physical environment (e.g., lanes, intersections, crosswalks, etc.). Thus, the ability of autonomous vehicles to perceive their environment and perform autonomous driving may be enhanced by utilizing the pre-computed information in an HD map.

An HD map may consist of multiple layers, including a base layer, a geometric map layer, a semantic layer, a map prior layer, and a dynamic layer. The geometric map layer may contain 3D information of the environment including raw sensor data from LiDAR sensors and cameras. The semantic layer may include semantic objects such as a lane boundary, intersections, and the like. The dynamic layer may include dynamic information such as observed speeds and congestion. These layers may provide a large amount of information for autonomous vehicles and may significantly improving autonomous driving performance.

However, most vehicle sensors, including LiDAR sensors and cameras, are line-of-sight based. As such, they are unable to capture environment information that is not within a line-of-sight. For example, a large truck in front of a vehicle may block most of the view of a camera on the vehicle. In addition, various unpredictable situation that may occur in real-world driving, such as poor weather or lighting conditions or obstacles, may impair the accuracy of sensors. Having incomplete sensor data may impair the driving performance of autonomous vehicles. For example, if an autonomous vehicle's view of a pedestrian is obstructed by an obstacle, the autonomous vehicle may not be able to detect the pedestrian with its sensors. Accordingly, a need exists for systems and methods to improve the ability of autonomous vehicles to detect their environment.

SUMMARY

In one embodiment, a method may include receiving sensor data, with one or more sensors of a vehicle, detecting an object based on the sensor data, determining pixel coordinates of the object based on the sensor data, converting the pixel coordinates of the object to world coordinates of the object, extracting a set of features associated with the object, and transmitting the set of features and the world coordinates of the object to a remote computing device. The sensor data may be associated with an environment of the vehicle.

In another embodiment, a method may include receiving, at a remote computing device, object data from a plurality of vehicles, the object data comprising locations of an object detected by the plurality of vehicles, determining an estimated location of the object based on the locations of the object detected by each of the plurality of vehicles, and broadcasting the estimated location of the object to each of the plurality of vehicles.

In another embodiment, a vehicle system may include one or more processors, one or more memory modules, one or more sensors to receive sensor data associated with an environment of a vehicle, and machine readable instructions stored in the one or more memory modules. When executed by the one or more processors, the machine readable instructions may cause the vehicle system to detected an object based on the sensor data, determine pixel coordinates of the object based on the sensor data, convert the pixel coordinates of the object to world coordinates of the object, extract a set of features associated with the object, and transmit the set of features and the world coordinates of the object to a remote computing device.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods to aggregate and distribute dynamic information of crowdsourcing vehicles for edge-assisted live map service.

As an autonomous vehicle is driven through an environment, it may collect a large amount of sensor data to detect objects in the environment, such as pedestrians, vehicles, or other road agents. The autonomous vehicle may then adjust its driving behavior based on the objects detected in the environment. Yet, if the vehicle sensors' line-of-sight is blocked by other vehicles or obstacles, the autonomous vehicle may be unable to accurately detect objects within its environment. This may impair the driving performance of the autonomous vehicle. However, there may be other vehicles present within the environment that have a better view of the road agents or other objects within the environment. As such, multiple vehicles in an environment may all collect sensor data and detect objects in the environment. Data regarding the objects detected by each vehicle may then be transmitted to a server, which may aggregate the data and may maintain a crowdsourced dynamic map of the environment. This dynamic map may then be transmitted to vehicles in the environment. This crowdsourced dynamic map may allow vehicles to better determine the presence of objects in the environment than would be possible by relying solely on each vehicle's individual sensors.

Figure 1:
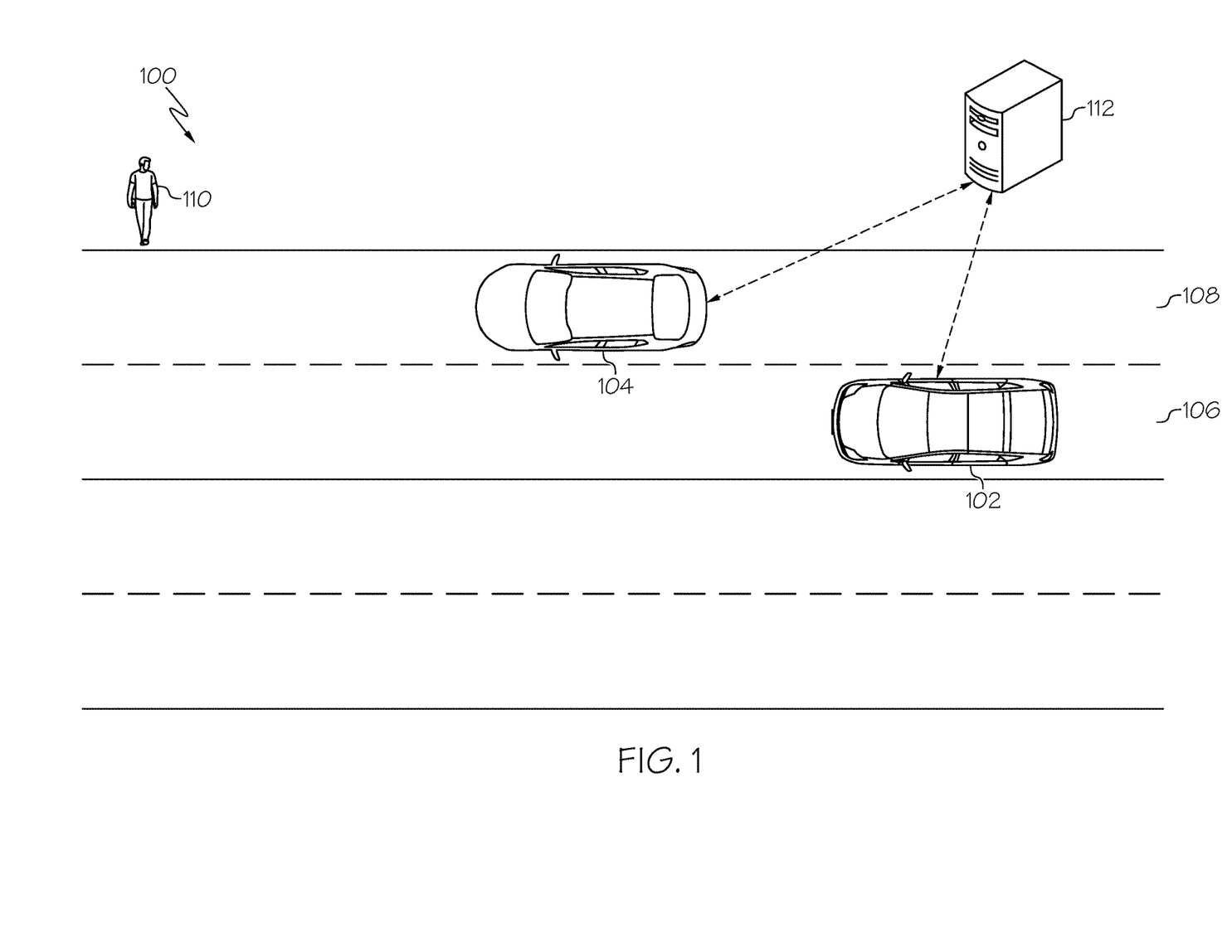
FIG. 1 depicts an example road portion to illustrate the features of the disclosed technology, according to one or more embodiments shown and described herein.

FIG. 1 depicts an example road portion 100 to illustrate the features of the disclosed technology. In the example of FIG. 1, a first vehicle 102 and a second vehicle 104 drive along the road portion 100. The first vehicle 102 drives in a lane 106, while the second vehicle 104 drives in an adjacent lane 108 ahead of the first vehicle 102. A pedestrian 110 stands along the side of the road. The pedestrian 110 is within a line-of-sight of the second vehicle 104. As such, sensors from the second vehicle 104 may easily detect the pedestrian 110. However, the second vehicle 104 is positioned between the first vehicle 102 and the pedestrian 110. Thus, the sensors of the first vehicle 102 may not be able to detect the pedestrian 110.

In the example of FIG. 1, the vehicles 102 and 104 may communicate with a remote computing device or server 112, as disclosed herein. Specifically, data regarding objects detected by the vehicles 102 and 104 may be transmitted to the server 112. The server 112 may aggregate this data and create a dynamic map of the road portion 100 based on the aggregated data. This dynamic map may indicate the presence of the pedestrian 110. This dynamic map may then be transmitted to the vehicles 102 and 104. As such, the first vehicle 102 may be aware of the presence of the pedestrian 110, even though the sensors of the vehicle 102 are unable to directly detect the presence of the pedestrian 110.

In the illustrated example, the vehicles 102 and 104 may be autonomous vehicles that navigates their environments with limited human input or without human input. In other examples, the vehicle 102 and/or the vehicle 104 may be a non-autonomous vehicle. Each of the vehicles 102 and 104 may be a vehicle including an automobile or any other passenger or non-passenger vehicle such as, for example, a terrestrial, aquatic, and/or airborne vehicle. In some embodiments, one or more of the vehicles 102 and 104 may be an unmanned aerial vehicle (UAV), commonly known as a drone.

The server 112 is communicatively coupled to the vehicles 102 and 104. In some examples, the server 112 may be a cloud based server. In some examples, the server 112 may be a fixed edge server, e.g., a road-side unit (RSU). In some examples, the server 112 may be a moving edge server, e.g., another vehicles on the road portion 100. In the illustrated example, the server 112 may be positioned near the road portion 100 such that it can be communicatively coupled to the vehicles 102 and 104. The server 112 may provide coverage for a particular service area encompassing the road portion 100. Other proximal servers (not shown) may be spaced such that each proximal server provides coverage for a different service area. That is, as the vehicle 102 drives, it may always be within range of at least one server such that the vehicle 102 may be connected to that server. Thus, as the vehicle 102 drives, it may move between service areas of different servers, which may provide the services described herein.

Figure 2:
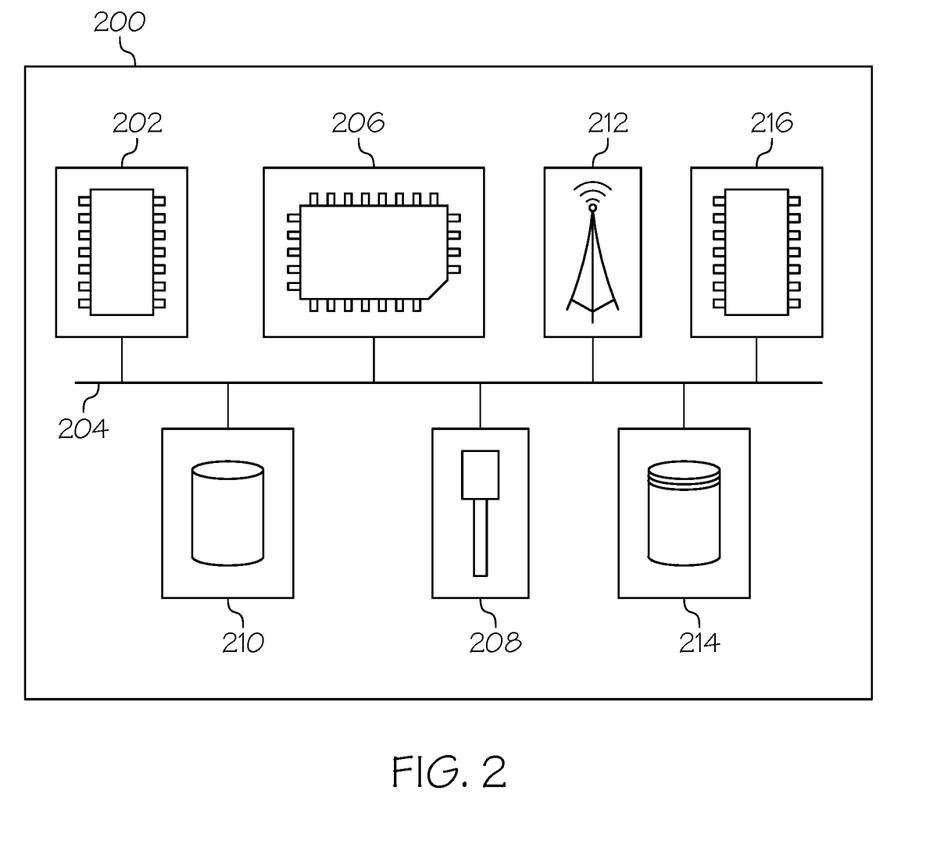
FIG. 2 depicts a schematic diagram of a vehicle system, according to one or more embodiments shown and described herein.

FIG. 2 depicts a vehicle system 200 included in the vehicle 102 of FIG. 1. The vehicle system 200 includes one or more processors 202, a communication path 204, one or more memory modules 206, a satellite antenna 208, one or more vehicle sensors 210, network interface hardware 212, a local database 214, and an electronic control unit (ECU) 216. The vehicle system 200 may also include one or more modules for performing autonomous driving of the vehicle 102. These modules are not shown in FIG. 2 for brevity. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Based on the location, the vehicle system 200 may determine a type of the road on which the vehicle is currently traveling. For example, the vehicle system 200 may match the location of the vehicle with a map that including information about roads and determines the type of the road.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., RGB cameras, depth cameras, laser sensors, proximity sensors, location sensors (e.g., GPS modules)), and the like. The vehicle sensors 210 may monitor the surroundings of the vehicle 102 and the data gathered by the sensors may be used by an autonomous driving module to autonomously navigate the vehicle 102. In addition, data captured by the vehicle sensors 210 may be used by the ECU 216 to perform object detection and other functions as discussed below.

The vehicle system 200 comprises network interface hardware 212 for communicatively coupling the vehicle system 200 to the server 112. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol.

The vehicle system 200 comprises a local database 214. The local database 214 may store data associated with objects detected by the ECU 216 and object data received form the server 112. The data stored in the local database 214 is discussed in further detail below.

The vehicle system 200 comprises the ECU 216. As described in further detail below, the ECU 216 may receive data collected by the vehicle sensors 210 and may perform object detection and other functions described herein based on the received data. The ECU 216 is described in further detail below with respect to FIG. 3. While the ECU 216 is illustrated as a separate element from the one or more processors 202 and the one or more memory module 206 in FIG. 2, in some embodiments, the ECU 216 may include the one or more processors 202 and/or the one or more memory module 206.

Figure 3:
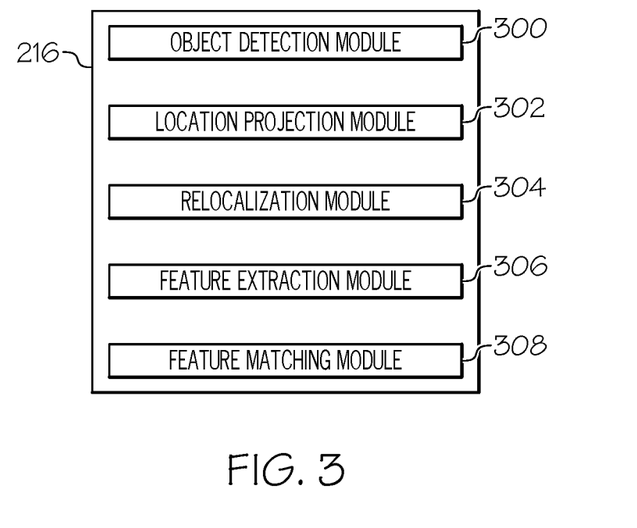
FIG. 3 depicts a schematic diagram of an electronic control unit of the vehicle system of FIG. 2, according to one or more embodiments shown and described herein.

FIG. 3 depicts components of the ECU 216 of the vehicle system 200. The ECU 216 includes an object detection module 300, a location projection module 302, a relocalization module 304, a feature extraction module 306, and a feature matching module 308. Each of the object detection module 300, the location projection module 302, the relocalization module 304, the feature extraction module 306, and the feature matching module 308 may be a program module in the form of operating systems, application program modules, and other program modules stored in the ECU 216. In some embodiments, the program module may be stored in a remote storage device that may communicate with the server 112. Such a program module may include, but is not limited to, routines, subroutines, programs, objects, components, data structures and the like for performing specific tasks or executing specific data types as will be described below.

The object detection module 300 may detect objects around the vehicle 102 based on sensor data. Specifically, the object detection module 300 may receive data captured by the vehicle sensors 210 and may output the bounding box coordinates (e.g., pixel coordinates) and labels of each detected object. The object detection module 300 may utilize a convolution neural network framework. In some examples, the object detection module 300 utilizes a known framework such as the "you only look once" (YOLO) object detection algorithm. In these examples, the object detection module 300 utilizes a deep neural network to classify objects into the 80 classes specified in the YOLO algorithm. In other examples, the object detection module 300 may utilize a smaller neural network architecture with fewer object classes by using neural network pruning techniques. In these examples, the object detection module 300 may achieve similar detection accuracy to the YOLO algorithm while consuming less computing resources and requiring less time to complete.

The location projection module 302 may project the pixel coordinates of objects detected by the object detection module 300 into absolute world coordinates of objects. The pixel coordinates may represent coordinates of an object with respect to a particular image captured by the vehicle sensors 210, whereas the absolute world coordinates may represent coordinates of the object with respect to the physical environment of the vehicle 102. While the pixel coordinates may be different for each vehicle, the world coordinates are the same for all vehicles. Thus, converting pixel coordinates of the objects detected by the object detection module 300 to world coordinates of the objects may allow objects detected by different vehicles to be shared under the same coordinate system. The location projection module 302 performs this projection in two steps. First, pixel coordinates are converted to camera coordinates, which comprise coordinates of a detected object with respect to a camera that captured an image of a detected object. Then, camera coordinates of the detected object are converted to world coordinates of the object.

As described above, the vehicle sensors 210 may include a camera. The camera may have certain specifications, including camera sensor size ($D_x$, $D_y$), focal length (F), and resolution of RGB image ($R_x$, $R_y$). For a point (x, y) in pixel coordinates and a depth (d), the location projection module 302 may project the pixel coordinates (x, y) to camera coordinates ($C_x$, $C_y$, $C_z$) using the below equations (1) through (3).

$$C_x = \frac{d \times (x - 0.5 \times R_x)}{f} \quad \text{Equation (1)}$$

$$C_y = \frac{d \times (y - 0.5 \times R_y)}{f} \quad \text{Equation (2)}$$

$$C_z = d \quad \text{Equation (3)}$$

After converting the pixel coordinates to camera coordinates using the above equations, the location projection module 302 may convert the camera coordinates ($C_x$, $C_y$, $C_z$) to world coordinates using the equation (4) below.

$$W = M_{c2w} \times [C_x, C_y, C_z, 1]^T \quad \text{Equation (4)}$$

In the equation (4), $M_{c2w}$ is a camera to world matrix produced by the relocalization module 304. Specifically, the relocalization module 304 uses RGB images and GPS information corresponding to the location of the vehicle 102 to relocalize the absolute location of cameras and other vehicle sensors 210. The relocalization module 304 may utilize simultaneous localization and mapping (SLAM) or other suitable techniques to perform this relocalization.

By using the above techniques, the location projection module 302 may obtain world coordinates of all objects detected by the object detection module 300. However, it may also be desirable to learn certain characteristics of the detected objects. This may allow the vehicle system 200 to determine whether a detected object is a new object or a previously detected object that has simply been detected again. Accordingly, characteristics of detected objects may be determined using techniques described below.

The feature extraction module 306 may extract features of objects detected by the object detection module 300. As such, when an object is detected, the features of the detected object may be determined and may be compared to previously detected objects to determine whether the object is a newly detected object or if it has been previously detected.

Conventional methods of feature extraction rely on computer vision algorithms such as scale-invariant feature transform (SIFT), speeded up robust features (SURF), Oriented FAST and rotated BRIEF (ORB), and the like. However, these feature extraction algorithms typically generate a considerable number of features compared to the data size of an object image, which increases the computational complexity of feature matching. Moreover, these algorithms run relatively slowly, which may overwhelm the computational capabilities of the vehicle system 200. Accordingly, the feature extraction module 306 utilizes machine learning techniques with an advanced neural network architecture, specifically an autoencoder, to extract the feature of detected objects.

An autoencoder is an unsupervised machine learning technique that consists of an encoder neural network and a decoder neural network. In an autoencoder, a high-dimensional image is encoded into a low-dimensional latent vector, and the latent vector is decoded into a rebuilt image. Accordingly, the latent vector may be used to represent the features of the image. Because the latent vector is of lower dimensionality than the input image, the data comprising the features of an image may be significantly reduced.

In the illustrated example, after an object is detected by the object detection module 300, the feature extraction module 306 uses an autoencoder to extract features from an image of the object. The feature matching module 308 may then compare the features of the detected object extracted by the feature extraction module 306 to the features of known objects stored in the local database 214, using the techniques described below. This may allow the vehicle system 200 to determine whether a detected object is a newly detected object or another detection of a previously detected object.

Figure 8:
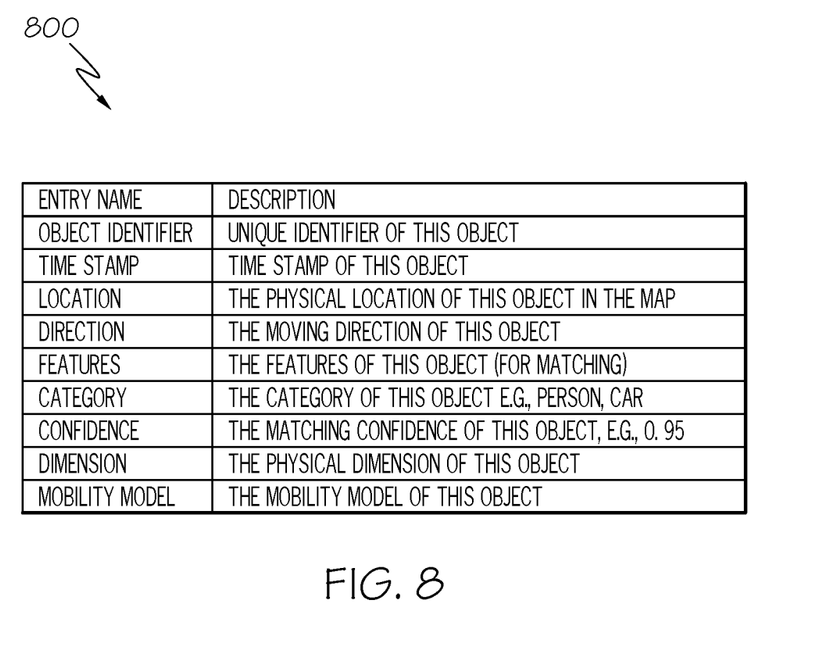
FIG. 8 depicts an example table of object data that may be stored by the vehicle system of FIG. 2 and the remote computing device of FIG. 4, according to one or more embodiments shown and described herein.

The local database 214 may store data regarding objects detected by the ECU 216 as well as objects detected by other vehicles (e.g., vehicle 104) and transmitted to the vehicle system 200 by the server 112. As such, the local database 214 keeps track of all objects detected by participating vehicles. The data stored in the local database 214 may include extracted features of detected objects as well as other data, as shown in table 800 of FIG. 8. In particular, as shown in table 800 of FIG. 8, the data stored in the local database 214 for a detected object may include values for the following fields:

an object identifier to uniquely identify an object;
a time stamp indicating a time when the object was detected;
a physical location of the object;
a direction that the object is moving;
the features of an object as determined by the feature extraction module 306;
a category of an object (e.g., a pedestrian, a car, etc.);
a matching confidence of the object (e.g., 0.95);
one or more physical dimensions of the object; and
a mobility model of the object.

Figure 9:
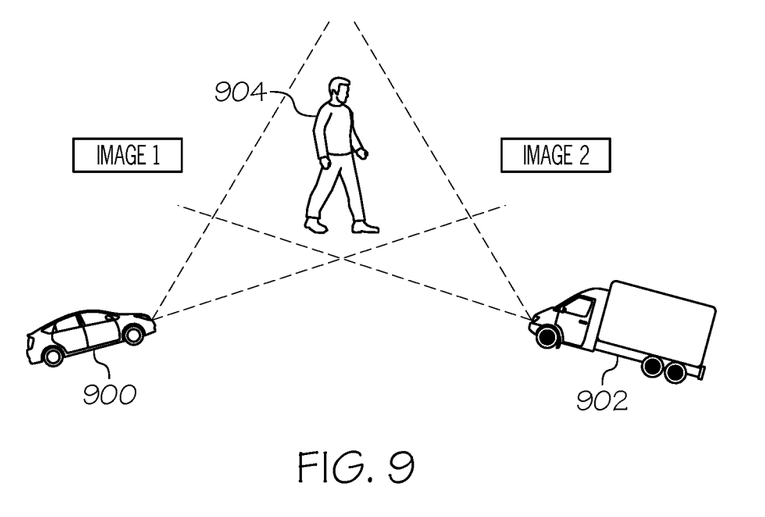
FIG. 9 depicts an example of two vehicles detecting a pedestrian, according to one or more embodiments shown and described herein.

Referring back to FIG. 3, when an object is detected by the object detection module 300 and its features are extracted by the feature extraction module 306, the feature matching module 308 may compare the extracted features to features of objects in the local database 214 to determine if the detected object already exists in the local database 214. However, the features of an object detected by different vehicles may be different, even if the vehicles detect the same object. For example, as shown in FIG. 9, vehicle 900 and vehicle 902 may both capture an image of a pedestrian 904. Yet, because the two vehicles 900, 902 are on different sides of the pedestrian 904, the images of the pedestrian 904 captured by the vehicles 900, 902 will not be the same. Accordingly, it may be desirable for the feature matching module 308 to be able to determine whether two feature sets of two different objects are in fact associated with the same object, even if the feature sets are somewhat different.

One known technique of feature matching utilizes mean square error (MSE) minimization. However, using MSE as a metric may not sufficiently match feature sets of a single object captured by two different vehicles. Accordingly, in embodiments, the feature matching module 308 integrates MSE and geo-distance error (GDE). Specifically, the feature matching module 308 computes a distance function D(x, y) for objects (x, y) using the equation (5) below.

$$D(x, y) = \underbrace{\sum_{v \in V} \|x_v - y_v\|}_{MSE} + \alpha * \underbrace{\sum_{d \in D} \|x_d - y_d\|}_{GDE} \quad \text{Equation (5)}$$

In the equation (5), V and D are the set of latent vectors (i.e., feature values) and coordinates, respectively. The weight α is used to balance the MSE and GDE in the distance function. $x_v$ and $x_d$ are the latent vector and coordinates of the object x. Then, given a detected object x, the feature matching module 308 determines that the object x is in the local database 214 only if y=min(D(x, y), ∀y∈Y) and D(x, y)>H where H is a distance threshold. Otherwise, the feature matching module 308 determines that the object x is a new object that has not previously been detected. In some examples, the feature matching module 308 may determine a confidence of the matching of the detected object x based on the computed value of the distance function D(x, y).

When the feature matching module 308 determines that a new object has been detected, using the techniques described above, the vehicle system 200 transmits data associated with the object (e.g., the data shown in table 800 of FIG. 8) to the server 112. Similarly, other vehicles (e.g., vehicle 104) that detect objects may also upload data associated with detected objects the server 112. This data may be received by the server 112, which is described below with respect to FIG. 4.

Figure 4:
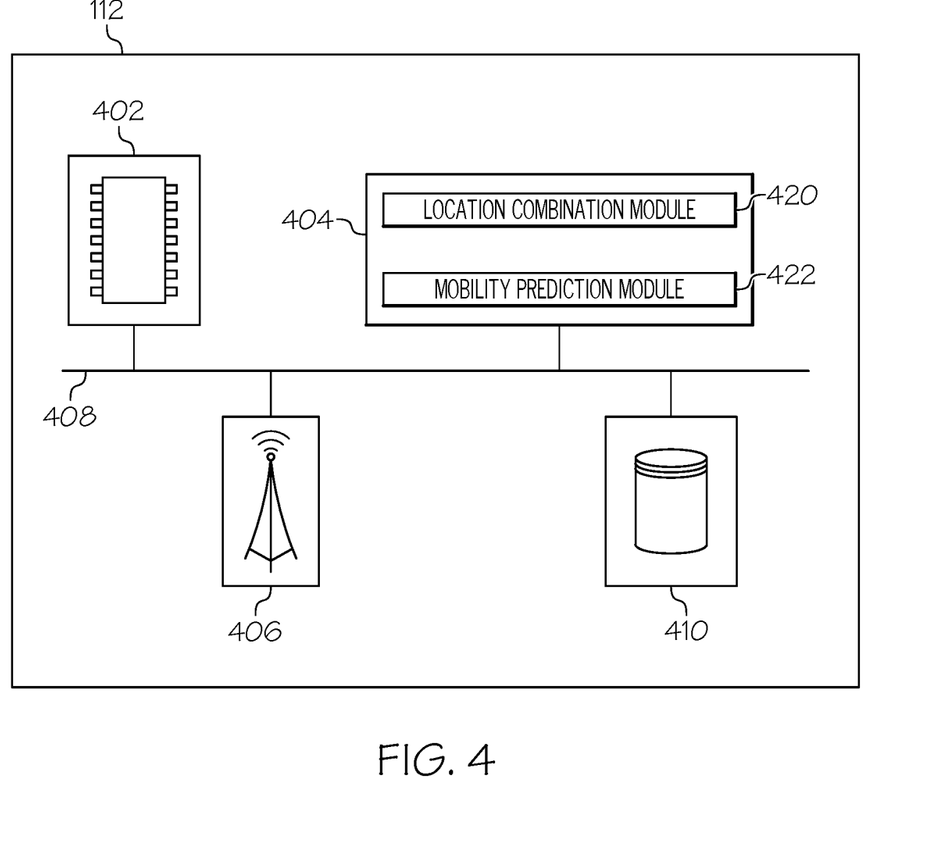
FIG. 4 depicts a schematic diagram of a remote computing device for aggregating and distributing dynamic information of crowdsourcing vehicles for edge-assisted live map service, according to one or more embodiments shown and described herein.

Now referring to FIG. 4, the server 112 comprises one or more processors 402, one or more memory modules 404, network interface hardware 406, a communication path 408, and a global database 410. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the server 112 may transmit and receive data to and from vehicles (e.g., vehicles 102 and 104).

The global database 410 may store data received from vehicles (e.g., vehicles 102 and 104). The data received may be associated with detected objects. Thus, the global database 410 may store data associated with objects detected by all participating vehicles within the service area of the server 112. The use of the global database 410 is discussed further below.

The one or more memory modules 404 include a location combination module 420 and a mobility prediction module 422. Each of the location combination module 420 and the mobility prediction module 422 may be a program module in the form of operating systems, application program modules, and other program modules stored in one or more memory modules 404. In some embodiments, the program module may be stored in a remote storage device that may communicate with the server 112. Such a program module may include, but is not limited to, routines, subroutines, programs, objects, components, data structures and the like for performing specific tasks or executing specific data types as will be described below.

As explained above, the server 112 may receive data associated with objects detected by multiple vehicles. In particular, the server 112 may receive the data shown in table 800 of FIG. 8 for each object detected by each vehicle. However, because different vehicles may detect the same object, the server 112 may receive data from different vehicles associated with the same object (e.g., having the same object identifier). As such, it may be desirable to combine the data from each vehicle associated with a single object into a single data record. This may be accomplished by the location combination module 420, using the techniques described below.

The location combination module 420 may combine data received from multiple vehicles associated with a single detected object (e.g., having the same object identifier). In particular, the location combination module 420 may determine a single estimated location of an object, even though different vehicles may have each determined different locations for the object. One method of determining an estimated location of an object would be to average all the locations of the object as determined by each vehicle that detected the object. However, this may result in a large error if a particular vehicle miscalculates the position of the object. Thus, in embodiments, the location combination module 420 considers a confidence of the matching objects (e.g., using the confidence value as shown in table 800 of FIG. 8), as described herein.

In embodiments, the location combination module 420 may use a ratio-squared combining technique for location combination, where the ratio is the confidence of matched objects. In this way, locations with higher confidence will contribute a greater weight towards the final estimated location than locations with lower confidence. This may result in an overall more accurate estimated location as determined by the location combination module 420. In some examples, the location combination module 420 may combine the features sets of an object determined by different vehicles in a similar manner to determine a single estimated feature set for the object.

In addition, the mobility prediction module 422 may track and predict the mobility of each detected object. In embodiments, the mobility prediction module 422 adopts a linear mobility model for each moving object. Specifically, if the location of an object at times t−1 and t are $L_{t-1}$ and $L_t$, respectively, then the predicted location at time t+1 is calculated as $L_{t+1}=2 \times L_t - L_{t-1}$. In some examples, more advanced mobility models may be incorporated that take into account additional object history.

After the location combination module 420 combines data associated with common objects and the mobility prediction module 422 determines a mobility of each detected object, a record may be stored in the global database 410 comprising data associated with each detected object. In embodiments, the data stored in the global database 410 for each detected object may comprise values of the data fields shown in table 800 of FIG. 8. As data is continually received by the server 112, the server 112 may continue to store new records associated with detected objects in the global database 410. Thus, the global database 410 contains a history of object data for detected objects over time.

After the server 112 stores new data records for each detected object, the network interface hardware 406 may broadcast the data to all vehicles within the service area of the server 112 (e.g., vehicles 102 and 104 in the example of FIG. 1). The data comprises location data for all objects detected by any vehicles within the service area of the server 112. Accordingly, all participating vehicles may have access to a dynamic map of all detected objects within the service area. When the vehicle 102 receives this data from the server 112, the vehicle system 200 may update the data stored in the local database 214. In addition, an outdate period $T_{out}$ may be set as a time period after which to remove all object data which has been in the global database 410 and/or the local database 214 longer than the outdate period. This ensures that a database does not completely fill with old data.

Figure 5:
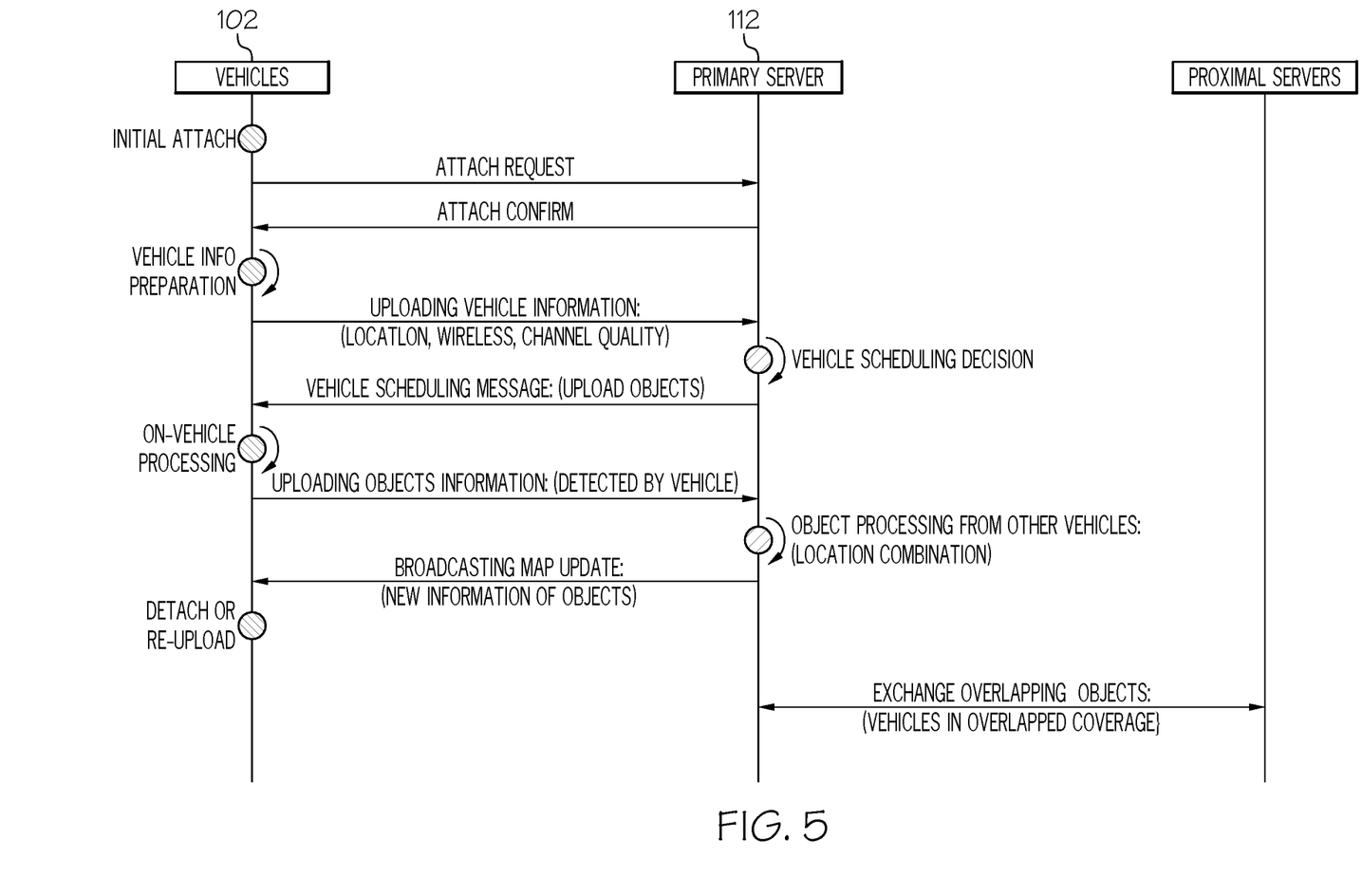
FIG. 5 depicts a communication protocol for communications between a vehicle and the remote computing device of FIG. 4, according to one or more embodiments shown and described herein.

FIG. 5 depicts a communication protocol for communications between a vehicle (e.g., the vehicle 102), the server 112, and proximal servers (e.g., servers providing service in adjacent areas to the service area of the server 112). In embodiments, the vehicle 102 may submit an attach request to the server 112 to participate in the service of the server 112. This attach request allows the vehicle 102 to establish an active network connection with the server 112 such that the vehicle may transmit and receive data to and from the server 112 while the vehicle 102 is within the service area of the server 112. The server 112 may receive the attach request and may confirm the attach request by transmitting an attach confirmation to the vehicle 102 signifying that the vehicle 102 and the server 112 are connected.

Once the vehicle 102 is attached to the server 112, the vehicle 102 may prepare and transmit vehicle information to the server 112. This vehicle information may comprise on-vehicle computation capability, wireless channel quality, camera specification, etc. The server 112 may receive the vehicle information and may then determine whether the vehicle 102 will be scheduled at a particular time slot (e.g., whether to receive object data from the vehicle 102 at the particular time slot). When the server 112 determines to receive object data from the vehicle 102 during the particular time slot, the server 112 may transmit a scheduling confirmation to the vehicle 102.

Once the vehicle 102 receives the scheduling confirmation from the server 112, the vehicle sensors 210 may begin to capture sensor data, perform on-vehicle computations and generate information associated with detected objects, as discussed above. The vehicle 102 may then transmit data associated with detected objects to the server 112. The server 112 may receive the data associated with the detected objects from the vehicle 102 and may also receive object detection data from other vehicles.

After the server 112 receives data associated with detected objects from one or more vehicles, the server 112 may combine the data as described above and generate object detection records. The server 112 may then broadcast the data associated with detected objects to all vehicles in the service area of the server 112. In some examples, if one or more detected objects are located in overlapping service areas of proximal servers, the server 112 may exchange data associated with these objects with the proximal servers.

Figure 6:
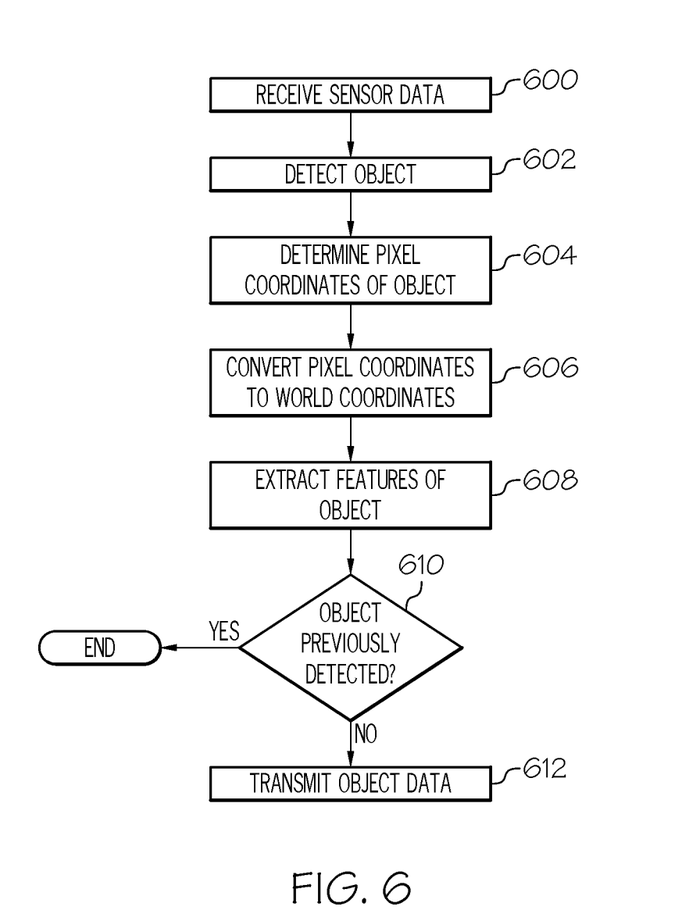
FIG. 6 depicts a flowchart of an example method of operating the vehicle system of FIG. 2, according to one or more embodiments shown and described herein.

FIG. 6 depicts a flowchart of an example method that may be performed by the vehicle system 200 of the vehicle 102.

At step 600, the vehicle sensors 210 receive sensor data. The sensor data may be associated with an environment of the vehicle 102. For example, the sensor data may be images captured by imaging sensors of the vehicle 102.

At step 602, the object detection module 300 detects an object based on the sensor data. The object detection module 300 may detect the object using a convolutional neural network. Then, at step 604, the object detection module 300 determines pixel coordinates of the object based on the sensor data.

At step 604, the location projection module 302 determines pixel coordinates of the object based on the sensor data. Then, at step 606, the location projection module 302 converts the pixel coordinates of the object to world coordinates. This may comprise first converting the pixel coordinates to camera coordinates, and then converting the camera coordinates to the world coordinates. The satellite antenna 208 may receive location data of the vehicle 102 and the relocalization module 304 may relocalize an absolute location of the vehicle sensors 210 based on the location data.

At step 608, the feature extraction module 306 extracts a set of features associated with the object. The set of features associated with the object may comprise a feature vector determined using an autoencoder.

At step 610, the feature matching module 308 determines whether the object has previously been detected based on the set of features associated with the object and the world coordinates of the object. The feature matching module 308 may make this determination by comparing the set of features associated with the object to one or more sets of features associated with one or more previously detected objects and by comparing the world coordinates of the object to world coordinates of the one or more previously detected objects. The one or more sets of features associated with one or more previously detected objects and the world coordinates of the one or more previously detected objects may be stored in the local database 214 in FIG. 2. Specifically, the feature matching module 308 may determine a mean square error between the set of features associated with the object and the sets of features associated with the one or more sets of features associated with each of the one or more previously detected objects. The feature matching module 308 may also determine a geo-distance error between the world coordinates of the object and the world coordinates of each of the one or more previously detected objects. The feature matching module 308 may then determine whether the object has previously been detected based on the mean square error and the geo-distance error for the object and each of the one or more previously detected objects. The vehicle system 200 may also receive, from the server 112, a first data set associated with a first set of one or more detected objects, store the first data set in the local database 214, and determine whether the object is among the first set of one or more detected objects based on the set of features associated with the object and the world coordinates of the object.

If the feature matching module 308 determines that the object has previously been detected (yes at step 610), then the method of FIG. 6 ends. If the feature matching module 308 determines that the object has not been previously detected (no at step 610), then the vehicle system 200 transmits the set of features and the world coordinates to the server 112.

Figure 7:
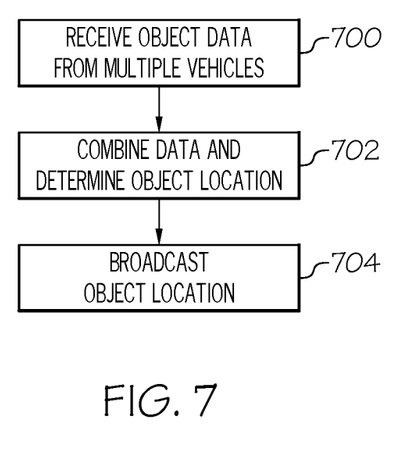
FIG. 7 depicts a flowchart of an example method of operating the remote computing device of FIG. 4, according to one or more embodiments shown and described herein.

FIG. 7 depicts a flowchart of an example method that may be performed by the server 112. At step 700, the server 112 receives object data from a plurality of vehicles. The object data may comprise locations of an object detected by each of the plurality of vehicles.

At step 702, the location combination module 420 combines the object data from the plurality of vehicles and determines an estimated location of the object based on the locations of the object detected by each of the plurality of vehicles. The server 112 may also receive confidence levels associated with the locations of the object detected by each of the plurality of vehicles and may determine the estimated location of the object based on the locations of the object detected by each of the plurality of vehicles and the confidence levels associated with the locations.

At step 704, the server 112 broadcasts the estimated location of the object to each of the plurality of vehicles. The mobility prediction module 422 may also predict a mobility of the object based on previously determined estimated locations of the object.

It should be understood that embodiments described herein are directed to systems and methods to aggregate and distribute dynamic information of crowdsourcing vehicles for edge-assisted live map service. Vehicles may detect objects using vehicle sensors and may determine a location of a detected object and may extract features of the detected object. The extracted features of the detected object may be matched against features of previously detected objects stored in a local database in the vehicle to determine if the detected object has previously been detected. If the object has not previously been detected, the vehicle may transmit object data, including the location of the object and extracted features of the object to a server.

The server may receive object data from a plurality of vehicles and may combine object data from multiple vehicles. If object data for a detected object is received from multiple vehicles, the server may determine an estimated location of the object. The server may then store the object data for a detected object, along with the determined estimated location of the object, in a global database. The server may then broadcast object data of all detected objects to all vehicles within a service area of the server.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving, from a remote computing device, a first data set associated with a first set of one or more detected objects;
   storing the first data set in a local database;
   receiving sensor data, with one or more sensors of a vehicle, wherein the sensor data is associated with an environment of the vehicle;
   detecting an object based on the sensor data;
   determining pixel coordinates of the object based on the sensor data;
   converting the pixel coordinates of the object to world coordinates of the object;
   extracting a set of features associated with the object;
   determining whether the object is among the first set of one or more detected objects based on the set of features associated with the object and the world coordinates of the object; and
   upon determination that the object is not among the first set of one or more detected objects, transmitting the set of features and the world coordinates of the object from the vehicle to the remote computing device.

2. The method of claim 1, further comprising:
   determining whether the object has previously been detected based on the set of features associated with the object and the world coordinates of the object; and
   upon determination that the object has not previously been detected, transmitting the set of features and the world coordinates of the object to the remote computing device.

3. The method of claim 2, further comprising:
   determining whether the object has previously been detected by comparing the set of features associated with the object to one or more sets of features associated with one or more previously detected objects and by comparing the world coordinates of the object to world coordinates of the one or more previously detected objects.

4. The method of claim 3, further comprising:
   determining a mean square error between the set of features associated with the object and the one or more sets of features associated with each of the one or more previously detected objects;
   determining a geo-distance error between the world coordinates of the object and the world coordinates of each of the one or more previously detected objects; and
   determining whether the object has previously been detected based on the mean square error and the geo-distance error for the object and each of the one or more previously detected objects.

5. The method of claim 1, further comprising:
   converting the pixel coordinates of the object to camera coordinates of the object; and
   converting the camera coordinates of the object to the world coordinates of the object.

6. The method of claim 5, further comprising:
   receiving location data of the vehicle; and
   relocalizing an absolute location of the sensors of the vehicle based on the location data.

7. The method of claim 1, wherein the set of features associated with the object comprises a feature vector determined using an autoencoder.

8. A vehicle system comprising:
   one or more sensors to receive sensor data associated with an environment of a vehicle; and
   a controller programmed to:
   receive, from a remote computing device, a first data set associated with a first set of one or more detected objects;
   store the first data set in a local database;
   detect an object based on the sensor data;
   determine pixel coordinates of the object based on the sensor data;
   convert the pixel coordinates of the object to world coordinates of the object;
   extract a set of features associated with the object;

determine whether the object is among the first set of one or more detected objects based on the set of features associated with the object and the world coordinates of the object; and upon determination that the object is not among the first set of one or more detected objects, transmit the set of features and the world coordinates of the object to a remote computing device.

9. The vehicle system of claim 8, wherein the controller is programmed to:

determine whether the object has previously been detected based on the set of features associated with the object and the world coordinates of the object; and upon determination that the object has not previously been detected, transmit the set of features and the world coordinates of the object to the remote computing device.

10. The vehicle system of claim 8, wherein the controller is programmed to:

convert the pixel coordinates of the object to camera coordinates of the object; and convert the camera coordinates of the object to the world coordinates of the object.

11. The vehicle system of claim 8, wherein the set of features associated with the object comprises a feature vector determined using an autoencoder.

12. The vehicle system of claim 9, wherein the controller is programmed to:

determine whether the object has previously been detected by comparing the set of features associated with the object to one or more sets of features associated with one or more previously detected objects and by comparing the world coordinates of the object to world coordinates of the one or more previously detected objects.

13. The vehicle system of claim 12, wherein the controller is programmed to:

determine a mean square error between the set of features associated with the object and the one or more sets of features associated with each of the one or more previously detected objects;

determine a geo-distance error between the world coordinates of the object and the world coordinates of each of the one or more previously detected objects; and determine whether the object has previously been detected based on the mean square error and the geo-distance error for the object and each of the one or more previously detected objects.

\* \* \* \* \*